No. 811,562. PATENTED FEB. 6, 1906.
C. W. HUNT.
FRICTION DEVICE FOR BRAKES AND CLUTCHES.
APPLICATION FILED JUNE 14, 1905.

2 SHEETS—SHEET 1.

Attest:
A. W. Jesbera.
M. A. Brayley.

Inventor:
Charles Wallace Hunt
by Redding, Kiddle & Greeley
Attys.

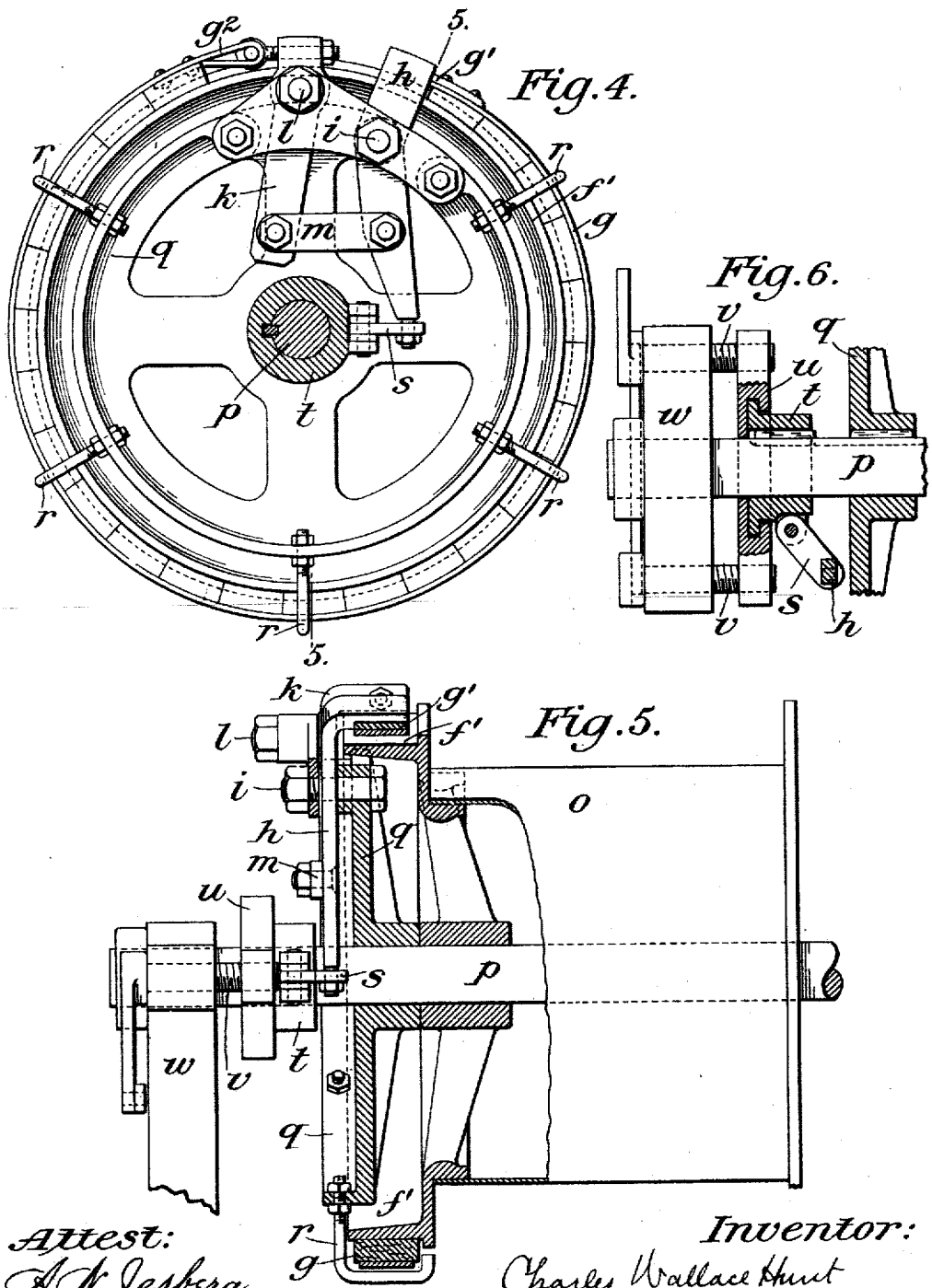

UNITED STATES PATENT OFFICE.

CHARLES WALLACE HUNT, OF WEST NEW BRIGHTON, NEW YORK.

FRICTION DEVICE FOR BRAKES AND CLUTCHES.

No. 811,562.　　Specification of Letters Patent.　　Patented Feb. 6, 1906.

Application filed June 14, 1905. Serial No. 265,142.

*To all whom it may concern:*

Be it known that I, CHARLES WALLACE HUNT, a citizen of the United States, residing in West New Brighton, borough of Richmond, city of New York, State of New York, have invented certain new and useful Improvements in Friction Devices for Brakes and Clutches, of which the following is a specification, reference being had to the accompanying drawings, forming a part hereof.

The object of this invention is to provide an improved friction device for brakes and clutches which shall operate with great power, although requiring comparatively slight movement of the actuating part and the operation of which shall be assisted by the relative movement of the parts.

The embodiments of the invention which have been chosen for illustration and explanation herein are designed with especial reference to the application of the invention in the operation of hoisting-drums, and in one case the invention is shown as embodied in a brake which is intended to be applied automatically when the drum is rotated backward under the stress of the load in order to prevent the backward rotation of the driving-motor, and in the other case it is shown as embodied in a clutch which is intended to control the hoisting-drum.

The invention will be more fully described hereinafter with reference to the accompanying drawings, in which it is illustrated, and in which—

Figure 1:
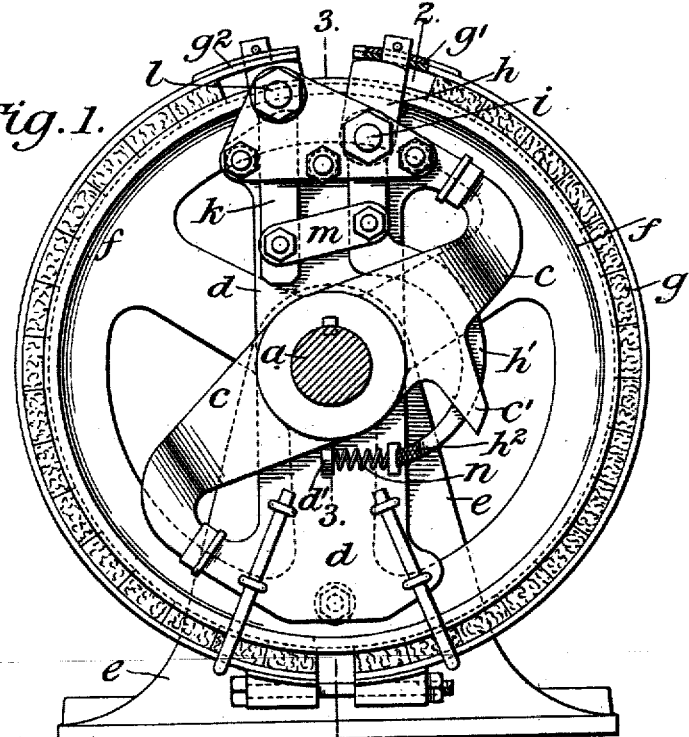
Figure 2:
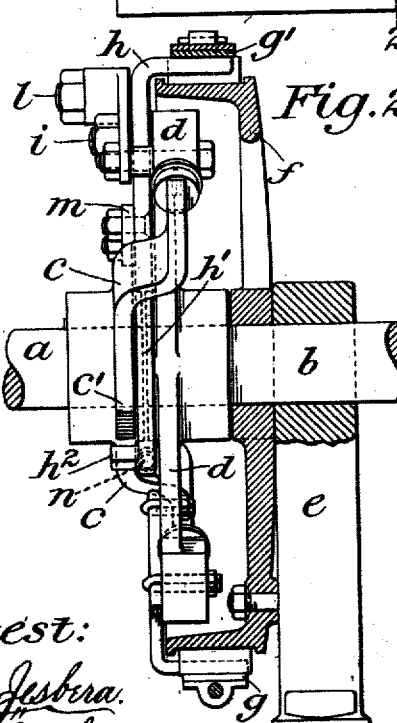
Figure 3:
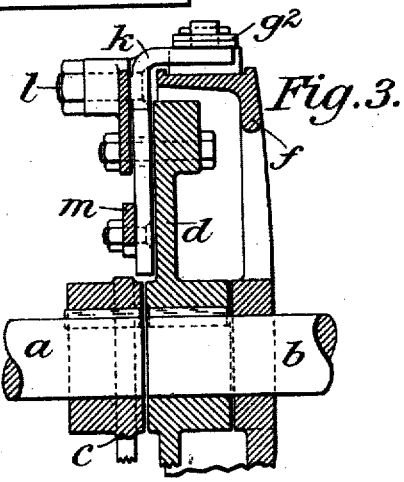

Figure 1 is a view in elevation, partly in section, showing the application of the invention to a brake to prevent backward rotation of the driving-shaft under the stress of the load. Fig. 2 is a view, partly in elevation and partly in section, on the irregular plane indicated by the line 2 2 of Fig. 1. Fig. 3 is a partial section on the plane indicated by the line 3 3 of Fig. 1. Fig. 4 is a view similar to Fig. 1, but illustrating the application of the invention to a clutch which is applied directly to a hoisting-drum. Fig. 5 is a view, partly in side elevation and partly in section, on the irregular plane indicated by the line 5 5 of Fig. 4, the hoisting-drum being shown in part. Fig. 6 is a detail view, partly in section, showing in part the brake-actuating mechanism.

In the embodiment of the invention illustrated in Figs. 1, 2, and 3 a driving-shaft is represented at $a$, and the shaft to be driven therefrom is indicated at $b$. To the driving-shaft is secured a driving-arm $c$, the end or ends of which are suitably formed to coöperate with a driven arm $d$, secured to the driven shaft or member $b$, so that the driven shaft or member shall be driven positively when the driving-shaft or member is rotated contra-clockwise. Secured to a suitable support, such as the pedestal $e$, is a stationary friction member $f$, shown in the present instance as an ordinary flanged brake-drum. The second member of the friction device, in this case the movable member, is shown as an ordinary brake-band $g$, arranged to coöperate with the stationary friction member $f$. In accordance with the present invention the two ends of the brake or friction band are arranged to be moved by devices hereinafter described in the same direction, but differentially, so that when the device is being closed both ends of the brake-band are moved in the same direction, contra-clockwise in the drawings, but with such relative speeds that the brake-band is caused to hug tightly the fixed friction member, and when the device is being opened both ends of the band are moved in the same direction, clockwise, but at different speeds, so that the brake-band is freed from the stationary friction member. In the construction shown one end $g'$ of the brake-band is carried by a lever $h$, which is pivoted at $i$ upon the arm $d$. The other end $g^2$ of the brake-band is carried by a lever $k$, which is pivoted at $l$ upon the arm $d$. The two levers are also connected at their opposite ends, as by a link $m$. The pivots $i$ and $l$ of the two levers are so positioned with respect to each other, or, in other words, the two levers $h$ and $k$ are so proportioned, that the movement of the end $g'$ of the brake-band $g$ shall be considerably greater than the movement of the end $g^2$, the two arms of the lever $h$ being in this instance substantially equal, while the two arms of the lever $k$ are unequal, being approximately in the ratio of four to one. Consequently the movement of the end $g'$ of the brake-band is approximately four times greater than the corresponding movement of the end $g^2$. The lever $h$ in this form of the invention is preferably subjected to the action of a spring for the purpose of insuring light frictional contact between the band $g$ and the drum $f$, and it is therefore provided with an extension $h'$ to bear upon a spring $n$, which is supported by a stop $d'$ on the arm $d$. The arm $c$ is also preferably provided with a projection $c'$ to coöperate under certain conditions with a lateral projection $h^2$ of the extension $h'$. In the operation of this embodiment of the invention it will be assumed that the driving-shaft $a$ is rotated contra-clockwise. It therefore through the coöperation of the arms $c$ and $d$ carries the shaft $b$ in the same direction. The movement of the arm $d$ carries the pivots $i$ and $l$ of the levers $h$ and $k$ in the same direction, dragging the brake-band over the brake-drum. As the drag of the end $g'$ of the band is greater than that of the end $g^2$ of the band, the band is expanded relatively to the brake-drum, and is therefore released from effective contact with the brake-drum. If now the stress of the load tends to rotate the shaft $b$ in the opposite direction, it may be desirable, especially if the shaft $a$ be driven by an electric motor, to prevent backward rotation of the shafts $a$ and $b$. A slight backward rotation of the shaft $b$, carrying with it the arm $d$, moves the pivots $i$ and $l$ slightly in a clockwise direction in respect to the stationary friction member $f$. Through the slight frictional contact of the brake-band with the drum, as hereinbefore explained, the pivot $i$ of the lever $h$ is moved slightly with respect to the end $g'$ of the band, and the latter is therefore caused to hug the brake-drum still more tightly, since the corresponding movement of the end $g^2$ of the brake-band is much less. The power of application of the brake is therefore proportioned to the force which tends to rotate the shaft $b$ in the opposite direction, and all of the parts are therefore held firmly against rotation in the opposite direction. However, if the driving-motor is reversed then the projection $c'$ of the arm $c$ strikes the lateral projection $h^2$ of the extension $h'$ of the lever $h$, compresses the spring $n$, and moves the levers $h$ and $k$ upon their pivots, so as to move both ends of the brake-band toward the right hand in Fig. 1. Since the movement of the end $g'$ is much greater than the end $g^2$, as already explained, the brake-band is expanded and the brake released.

In the embodiment of the invention illustrated in Figs. 4, 5, and 6 the drum $o$, which is to be driven through the improved friction device, is represented as mounted loosely upon the driving-shaft $p$. To the latter is secured to rotate therewith a spider $q$, which in the operation of the improved device serves the purposes of the arm $d$ of the construction shown in Figs. 1, 2, and 3, furnishing the pivotal supports $i$ and $l$ for the levers $h$ and $k$, which have connected thereto at their outer ends, respectively, the ends of the friction-strap $g$, and on the other side of their fulcra are connected by the link $m$. The friction-strap $g$ in this instance coöperates with a friction-drum $f'$ on the hoisting-drum $o$. In this case guards $r$ are shown as secured to the spider $q$ for the purpose of limiting the outward movement of the friction-strap $g$. As will be readily understood, a slight movement of the lever $h$ upon its fulcrum produces a corresponding movement of the end $g'$ of the friction-strap in one direction and a much smaller movement of the end $g^2$ of the friction-strap in the opposite direction, so that the friction-strap is quickly released from operative engagement with the friction-drum or is caused to hug the same with great force, as the case may be. If the shaft $p$ and the spider $q$ be rotated in a direction contra-clockwise, tending to move the pivot $i$ of the lever $h$ away from the end $g'$ of the friction-strap, the tendency of the movement will be to disengage the strap from operative contact with the drum; but if the shaft and spider be rotated in a clockwise direction, so that the pivot $i$ of the lever $h$ tends to move forward of the end of the lever to which the end $g'$ of the friction-strap is attached, the tendency of the movement will be to cause the friction-strap to hug the drum more closely, and thereby increase the driving engagement.

The means which are provided for the operation of the clutch at will may be of any suitable construction. As shown in Figs. 4, 5, and 6 of the drawings, the inner end of the lever $h$ is connected by a link $s$ with a collar $t$, which is movable longitudinally on the shaft $p$, but is compelled to rotate therewith. The collar $t$ is engaged in turn by a collar $u$, which does not rotate, but can be moved longitudinally by suitable means, such as the screws $v$, which are carried by the stationary frame $w$.

Whether the improved friction device be applied to a brake or to a clutch and whether it be embodied in the particular structure shown and described herein or in other equivalent structures, it will be seen that it acts with great power and yet requires but slight movement of the operating part to bring it into action and to secure the power desired. It will be evident, moreover, that various changes may be made in the details of construction and arrangement without departing from the spirit of the invention.

I claim as my invention—

1. A friction device for brakes and clutches, comprising a friction-band, a friction-surface to coöperate with said band, differential levers independent and substantially radial to which the ends of said band are respectively secured and means to move both of said levers in one direction or the other, whereby the ends of said band are moved differentially in one direction or the other.

2. A friction device for brakes and clutches, comprising a friction-band, a friction-surface to coöperate with said band, differential levers independent and substantially radial to which the ends of said band are respectively secured, a support for said levers, said support and said friction-surface being relatively movable, and means to move said levers in one direction or the other.

3. A friction device for brakes and clutches, comprising a friction-band, a friction-surface to coöperate with said band, differential levers independent and substantially radial to which the ends of said band are respectively secured, a support for said levers, a connection between said levers, and means to actuate said levers.

4. A friction device for brakes and clutches comprising a friction-band, a friction-surface to coöperate with said band, two substantially radial levers pivoted at points between their ends and having respectively unequal arms, the ends of the band being respectively secured to the outer ends of said levers, a common support for said levers, a link connecting the inner arms of said levers at different distances from the pivots respectively, and means to actuate said levers.

5. A friction device, comprising a friction-band, a stationary friction-surface to coöperate with said band, a driving part, a driven part, and differential levers mounted on said driven part and having the ends of said band connected thereto respectively.

6. A friction device, comprising a friction-band, a stationary friction-surface to coöperate with said brake, a driving part, a driven part, differential levers mounted on said driven part and having the ends of said band connected thereto respectively, and a link connecting said levers.

7. A friction device, comprising a friction-band, a stationary friction-surface to coöperate with said brake, a driving part, a driven part, differential levers mounted on said driven part and having the ends of said band connected therewith respectively, and a spring operating on one of said levers to maintain frictional contact between said band and said friction-surface.

8. A friction device, comprising a friction-band, a stationary friction-surface to coöperate with said brake, a driving part, a driven part, and differential levers mounted on said driven part and having the ends of said band connected thereto respectively, said driving part being adapted to engage one of said levers in backward movement.

This specification signed and witnessed this 12th day of June, A. D. 1905.

CHARLES WALLACE HUNT.

In presence of—
WILLIAM D. STIVERS,
CHAS. E. SIMONSON.